United States Patent
Lin et al.

(10) Patent No.: US 12,086,014 B2
(45) Date of Patent: Sep. 10, 2024

(54) LOW POWER MANAGEMENT FOR ERP6 COMPLIANCE

(71) Applicant: DELL PRODUCTS L.P., Round Rock, TX (US)

(72) Inventors: Hsin-Tien Lin, Taoyuan (TW); Jui-Chin Fang, Taipei (TW); Geroncio Ong Tan, Austin, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 17/966,627

(22) Filed: Oct. 14, 2022

(65) Prior Publication Data

US 2024/0126358 A1    Apr. 18, 2024

(51) Int. Cl.
  *G06F 1/26* (2006.01)
  *G06F 1/32* (2019.01)
  *G06F 1/3287* (2019.01)
  *H02J 7/00* (2006.01)

(52) U.S. Cl.
  CPC ............ *G06F 1/3287* (2013.01); *G06F 1/263* (2013.01); *H02J 7/0068* (2013.01); *H02J 7/00712* (2020.01)

(58) Field of Classification Search
  CPC ...... G06F 1/3287; G06F 1/263; H02J 7/0068; H02J 7/00712
  See application file for complete search history.

(56) References Cited

U.S. PATENT DOCUMENTS

| | | | |
|---|---|---|---|
| 5,945,807 A | 8/1999 | Faulk | |
| 10,148,108 B2 * | 12/2018 | Nguyen | H02J 7/00712 |
| 11,095,463 B2 * | 8/2021 | Pelissier | H04L 12/10 |
| 2005/0001595 A1 | 1/2005 | May et al. | |
| 2010/0100752 A1 * | 4/2010 | Chueh | G06F 1/3296 |
| | | | 713/320 |
| 2010/0185877 A1 * | 7/2010 | Chueh | G06F 1/26 |
| | | | 713/340 |
| 2010/0332063 A1 * | 12/2010 | Saeki | B60L 58/30 |
| | | | 701/22 |
| 2012/0038339 A1 * | 2/2012 | Zhu | H02J 7/32 |
| | | | 323/282 |
| 2019/0236037 A1 * | 8/2019 | Sugumar | G06F 1/266 |
| 2020/0006960 A1 * | 1/2020 | Huang | H02J 7/0013 |
| 2021/0333855 A1 * | 10/2021 | Liu | H02J 7/0031 |
| 2023/0131325 A1 * | 4/2023 | Ha | H01M 50/574 |
| | | | 429/61 |
| 2023/0305615 A1 * | 9/2023 | Natarajan | G06F 13/4282 |

* cited by examiner

*Primary Examiner* — Xuxing Chen
(74) *Attorney, Agent, or Firm* — Larson Newman, LLP

(57) ABSTRACT

An information handling system includes a battery and a charger. The battery provides a battery voltage to a main power rail of the information handling system and is couplable to the main power rail through a switch. The charger has an output coupled to the main power rail and an input coupled to an external power adapter. The power adapter provides a selectable voltage level to the input. The information handling system selects a particular voltage level that is lower than the battery voltage and directs the switch to decouple the battery from the main power rail when the information handling system is in a soft power-off state.

20 Claims, 3 Drawing Sheets

LOW POWER MANAGEMENT FOR ERP6 COMPLIANCE

FIELD OF THE DISCLOSURE

This disclosure generally relates to information handling systems, and more particularly relates to low power management for ErP6 compliance in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a battery to provide a battery voltage to a main power rail of the information handling system. A charger may have an output coupled to a main power rail and an input coupled to an external power adapter. A power adapter may provide a selectable voltage level to the input. The system may select a particular voltage level that is lower than the battery voltage and direct the switch to decouple the battery from the main power rail when the system is in a soft power-off state.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
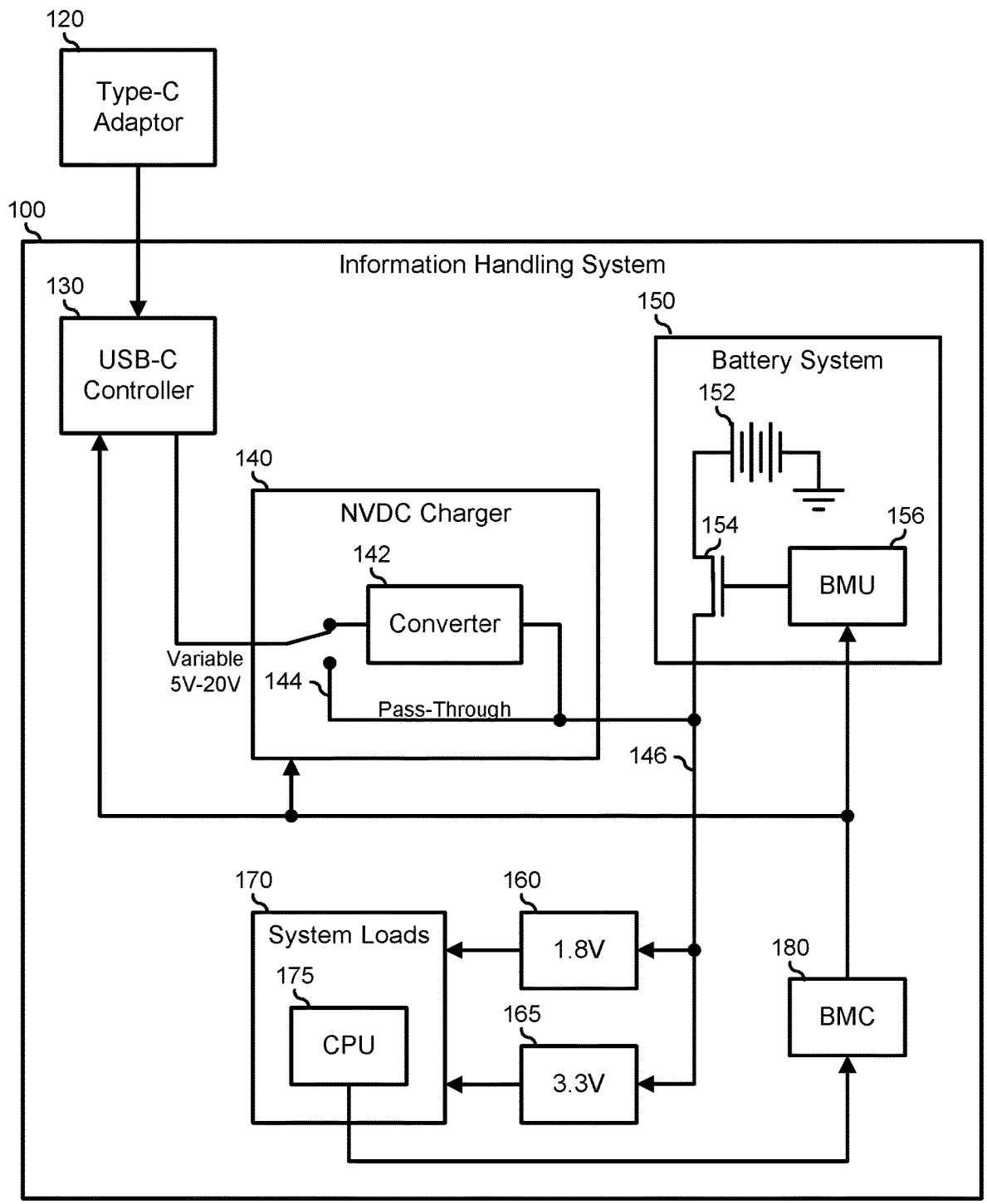
FIG. 1 is a block diagram of an information handling system according to an embodiment of the current disclosure.

FIG. 1 illustrates an information handling system 100 that is connected to receive power from a USB Type-C power adapter 120. Information handling system 100 illustrates the power delivery system for the information handling system, including a USB Type-C controller 130, a narrow voltage direct current (NVDC) charger 140, a battery system 150, a 1.8 volt (V) regulator 160, and a 3.3 V regulator 165. Adapter 120 receives power from an AC power source, such as a power outlet, and outputs a selected DC voltage. The output voltage from adapter 120 is typically selectable in a range from 5 V to 20 V, as needed or desired. Controller 130 operates to negotiate with power adapter 120 to select the output voltage from the power adapter, and to pass the selected voltage to an input of NVDC charger 140. NVDC charger 140 includes a voltage converter 142 and a pass-through circuit 144. NVDC charger 140 receives the selected voltage from controller 130, and selectively provides the voltage to converter 142 or to pass-through 144, as described further below. The output of converter 142, and pass-through 144 are connected to provide an output to a main power rail 146 of information handling system 100. It will be understood that a typical information handling system may include one or more additional voltage regulators that may be connected to a main power rail, as needed or desired. Moreover, it will be further understood that, where converter 142 represents a buck convert, pass-through circuit 144 may be implemented by turning on a high-side FET, rather than by a separate circuit, as needed or desired.

Battery system 150 includes a battery 152 and a FET switch 154. FET switch 154 is controlled to selectably connect battery 152 to main power rail 146, based upon an input from BMU 156, as described further below. Main power rail 146 provides power to regulators 160 and 165 that in turn provide respective 1.8 V and 3.3 V power rails to system loads 170. System loads 170 represent the elements of information handling system 100 that operate to provide the processing functions of the information handling system, and includes a processor (CPU) 175. Information handling system 100 further includes a baseboard management controller (BMC) 180 that provides out-of-band monitoring, management, and maintenance of the elements of the information handling system, as described further below. The power delivery system may include other voltage rails that operate in different states, as needed or desired. For example, BMC 180 is configured to receive power from one or more additional voltage rail. The details of power delivery systems in an information handling system are known in the art and will not be further described herein, except as may be needed to illustrate the current embodiments.

In a power-on state, such as an S0 state, NVDC charger 140 is configured to provide the input power from adapter 120 to converter 142, and the converter is configured to provide an output voltage on main power rail 146. Here the voltage level of the output from converter 142 will be sufficient to provide a charging voltage on battery 152. Thus the voltage level of the output of convert 142 will depend on the particular topology of battery 152. For example, where battery 152 is configured as a series three-cell (3S) battery, the battery will have a nominal operating voltage of 11.4 V, and so the voltage level of the output from converter 142 will be greater than 11.4 V to maintain a charging state on the battery. On the other hand, where battery 152 is configured as a series four-cell (4S) battery, the battery will have a nominal operating voltage of 15.2 V, and so the voltage level of the output from converter 142 will be greater than 15.2 V to maintain a charging state on the battery. In either case, the voltage on main power rail 146 is provided to regulators 160 and 165. Further, the output voltage from adaptor 120 will be selected to match the voltage level of the output of convert 142. In particular, the output voltage from adaptor 120 may be selected to optimize the conversion efficiency of converter 142. The details of power management and the selecting of optimum source voltage levels from USB Type-C power adaptors is known in the art and will not be further described herein, except as may be needed to illustrate the current embodiments.

It has been understood by the inventors of the current disclosure that the magnitude of the difference between the input voltage of a voltage regulator and the output voltage affects the efficiency of the voltage regulator. In particular, the closer the input voltage is to the output voltage, the more efficiently the voltage regulator operates. In this regard, NVDC charger 140, and particularly converter 142, operate more efficiently when the input voltage is closer to the output voltage provided in main power rail 146. Similarly, because the voltage provided on main power rail 146 is a function of specific topology of battery 152 (that is, 3S vs. 4S), regulators 160 and 165 operate more efficiently with a 3S battery than with a 4S battery.

In a soft power-off state, such as an S5 state, information handling system 100 operates with a minimal load in order to draw as small an amount of power as possible. In particular, in order to satisfy various regulatory requirements, such as the European Commission ErP Ecodesign Directive—Lot 6 Directive for Standby and Off-Mode (ErP6), an information handling system must satisfy a specified maximum current draw of 500 milliwatts (mW) from the AC adaptor in system standby or off-mode states, such as the S5 state. To meet such requirements, an information handling system typically shuts down as many functions and features as possible to retain the soft power-off state. However as noted, retaining a high main power rail voltage during the soft power-off state results in poor conversion efficiency of the voltage regulators and DC-DC converters in the typical information handling system, making it difficult to satisfy the various regulatory requirements.

In a particular embodiment, the voltage applied on main power rail 146 is varied based upon the operating power state of information handling system 100. In particular, when information handling system 100 is in a power-on state, such as the S0 state, the power distribution system operates as described above. However when information handling system 100 is in a power-off state, such as the S5 state, the power distribution system operates to lower the voltage provided on main power rail 146. As noted, the voltage applied by converter 142 is typically provided at a level needed to maintain a charge on battery 152. When information handling system 100 enters the power-off state, CPU 175 provides an indication to BMC 180, and the BMC directs BMU 156 to turn off FET switch 154, thereby disconnecting battery 152 from main power rail 146. In this way, NVDC charger 140 is able to provide a lower voltage level on main power rail 146.

In a particular case, BMC 180 further directs controller 130 to negotiate a lower input voltage from adapter 120. For example, BMC 180 can direct controller 120 to negotiate for adapter 120 to provide a 5 V output voltage. BMC 180 further directs NVDC charger 140 to switch the voltage input to pass-through circuit 144. In this way, the 5 V output from adapter 120 is connected directly to main power rail 144, and any conversion loss from converter 142 is eliminated. Further, the provision of 5 V on main power rail 144 results in a decrease in the conversion loss from regulators 160 and 165. In this way, the overall power draw by information handling system 100 is reduced in the power-off state due to the elimination of the conversion loss from NVDC charger 142, and the reduction of the conversion loss from regulators 160 and 165. Note that, as described above, information handling system 100 may include one or more additional regulator. For example a typical information handling system may include a 5V regulator for, e.g., USB interfaces or the like. Here, BMC 180 may direct controller 120 to negotiate for adapter 120 to provide a different voltage level greater than 5V to ensure sufficient voltage to account for any conversion loss in the 5V regulator. Thus, for example, BMC 180 may direct controller 120 to negotiate for adapter 120 to provide a 6V output from adaptor 120, or another voltage level, as needed or desired.

Figure 2:
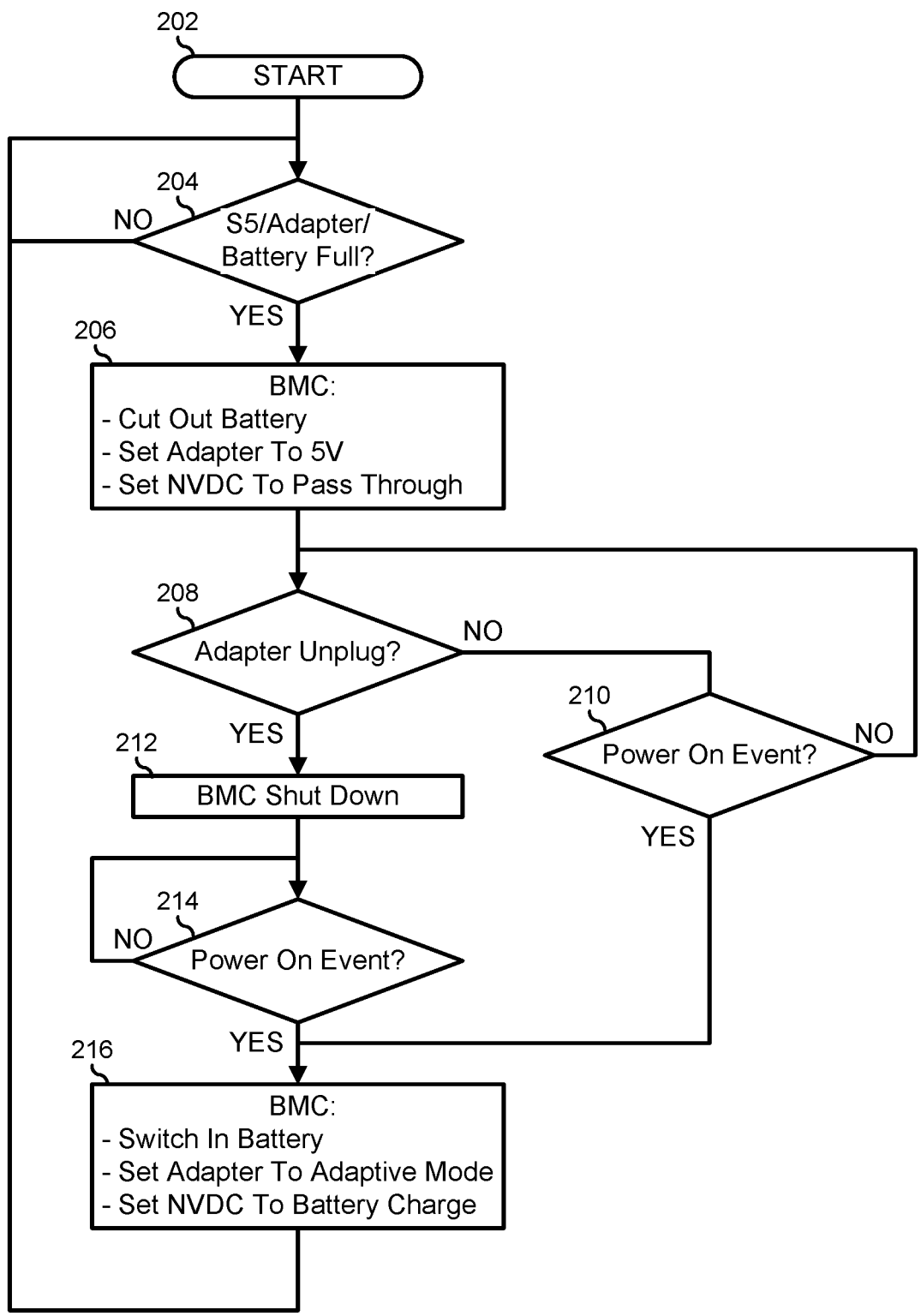
FIG. 2 is a flowchart illustrating a method for providing low power management for ErP6 compliance in an information handling system according to an embodiment of the current disclosure.

FIG. 2 illustrates a method 200 for providing low power management for ErP6 compliance in an information handling system, starting at block 202. A decision is made as to whether or not an information handling system is in an S5 operating state, an AC adapter is connected to the information handling system, and a battery of the information handling system is fully charged in decision block 204. If not, the "NO" branch of decision block 204 is taken and the method loops to decision block 204 until the information handling system is in an S5 operating state, the AC adapter is connected, and the battery is fully charged. When the information handling system is in an S5 operating state, the AC adapter is connected, and the battery is fully charged, the "YES" branch of decision block 204 is taken, and a BMC of the information handling system directs a BMU to disconnect the battery from a main power rail of the information handling system, to set the adapter to provide a 5 V output, and to set a NVDC charger of the information handling system to a pass-through mode in block 206.

A decision is made as to whether or not the adapter is disconnected from the information handling system in decision block 208. If so, the "YES" branch of decision block 208 is taken and the method proceeds to block 212 as described below. If the adapter is not disconnected from the information handling system, the "NO" branch of decision block 208 is taken and a decision is made as to whether or not a system wake event has been detected in decision block 210. If not, the "NO" branch of decision block 210 is taken and the method returns to decision block 208 where a decision is made as to whether or not the adapter is disconnected from the information handling system. If a system wake event has been detected, the "YES" branch of decision block 210 is taken and the method proceeds to block 218 as described below.

Returning to decision block 208, when the adapter is disconnected from the information handling system and the "YES" branch of decision block 208 is taken, the BMC shuts down in block 212. A decision is made as to whether or not a system wake event has been detected in decision block 214. If not, the "NO" branch of decision block 214 is taken and the method returns to decision block 214 until a system wake event is detected. When the system wake event is detected, the "YES" branch of either decision block 210 or decision block 214 is taken, the BMC directs a BMU to reconnect the battery to the main power rail, to set the adapter to renegotiate the output voltage with a USB C controller of the information handling system, and to set the NVDC charger connect the output of the adapter to a converter of the NVDC charger and the method returns to block 204 where a decision is made as to whether or not the information handling system is in the S5 operating state, the AC adapter is connected, and the battery is fully charged.

Figure 3:
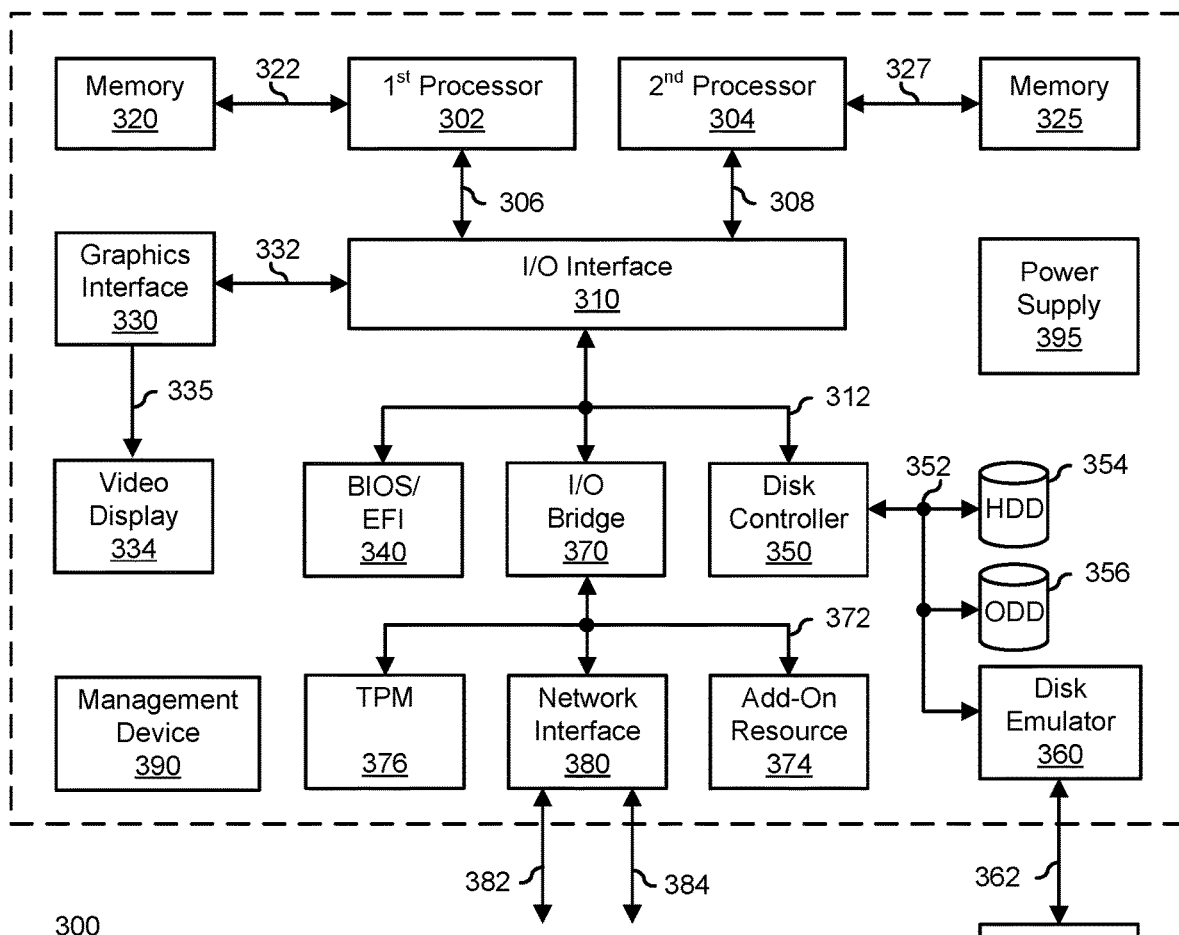
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a battery configured to provide a battery voltage to a main power rail of the information handling system, wherein the battery is couplable to the main power rail through a switch; and
a charger having an output coupled to the main power rail, and having an input coupled to an external power adapter configured to provide a selectable voltage level to the input;
wherein the information handling system is configured to select a first voltage level that is lower than the battery voltage and to direct the switch to decouple the battery from the main power rail when the information handling system is in a soft power-off state;
wherein the charger includes a converter coupled to the output, wherein the converter is configured to operate in a power conversion mode and in a pass-through mode; and
wherein, when the information handling system is in the soft power-off state, the converter is operated in the pass-through mode.

2. The information handling system of claim 1, further configured to select a second voltage level that is higher than the battery voltage and to direct the switch to couple the battery to the main power rail when the information handling system is in a power-on state.

3. The information handling system of claim 1, wherein, when the information handling system is in the power-on state, the converter is operated in the conversion mode.

4. The information handling system of claim 3, wherein the convert is further configured to select a second voltage level that is higher than the battery voltage in the conversion mode when the information handling system is in the power-on state.

5. The information handling system of claim 4, further comprising a baseboard management controller configured to determine that the information handling system is in the soft power-off state, and in response to select the first voltage level, to direct the switch to decouple the battery to the main power rail, and to direct the converter to operate in the pass-through mode.

6. The information handling system of claim 5, wherein the baseboard management system is further configured to determine that the information handling system is in the power-on state, and in response to select the second voltage level, to direct the switch to couple the battery to the main power rail, and to direct the converter to operate in the conversion mode.

7. The information handling system of claim 1, wherein the external power adapter is a USB-C power adapter.

8. The information handling system of claim 1, wherein the battery is one of a three-cell series battery and a four-cell series battery.

9. A method, comprising:
providing, by a battery of an information handling system, a battery voltage to a main power rail of the information handling system, wherein the battery is couplable to the main power rail through a switch;
coupling an output of a charger having to the main power rail, and having an input coupled to an external power adapter configured to provide a selectable voltage level to the input; and
when the information handling system is in a soft power-off state:
selecting a first voltage level that is lower than the battery voltage; and
directing the switch to decouple the battery from the main power rail;
wherein the charger includes a converter coupled to the output, and wherein the converter is configured to operate in a power conversion mode and in a pass-through mode; and
wherein, when the information handling system is in the soft power-off state, the method further comprises:
operating the converter in the pass-through mode.

10. The method of claim 9, wherein, when the information handling system is in a power-on state, the method further comprises:
selecting a second voltage level that is higher than the battery voltage; and
directing the switch to couple the battery to the main power rail.

11. The method of claim 9, wherein, when the information handling system is in the power-on state, the method further comprises:
operating the converter in the conversion mode.

12. The method of claim 11, wherein, when the information handling system is in the power-on state, the method further comprises:
selecting, by the converter, a second voltage level that is higher than the battery voltage in the conversion mode.

13. The method of claim 12, further comprising:
determining, by a baseboard management controller, that the information handling system is in the soft power-off state; and
in response to the determination:
selecting the first voltage level;
directing the switch to decouple the battery to the main power rail; and
directing the converter to operate in the pass-through mode.

14. The method of claim 13, further comprising:
determining, by the baseboard management system that the information handling system is in the power-on state; and
in response to the determination:
selecting the second voltage level;
directing the switch to couple the battery to the main power rail; and
directing the converter to operate in the conversion mode.

15. The method of claim 9, wherein the external power adapter is a USB-C power adapter.

16. An information handling system, comprising:
a battery configured to provide a battery voltage to a main power rail of the information handling system, wherein the battery is couplable to the main power rail through a switch;
a charger having an output coupled to the main power rail, and having an input coupled to an external power adapter configured to provide a selectable voltage level to the input; and
at least one voltage regulator coupled to the main power rail and configured to provide a regulated voltage to a load of the information handling system;
wherein the information handling system is configured to select a first voltage level that is lower than the battery voltage and to direct the switch to decouple the battery from the main power rail when the information handling system is in a soft power-off state;
wherein the charger includes a converter coupled to the output, wherein the converter is configured to operate in a power conversion mode and in a pass-through mode; and
wherein, when the information handling system is in the soft power-off state, the converter is operated in the pass-through mode.

17. The information handling system of claim 16, wherein, when the information handling system is in the power-on state, the converter is operated in the conversion mode.

18. The information handling system of claim 17, wherein the convert is further configured to select a second voltage level that is higher than the battery voltage in the conversion mode when the information handling system is in the power-on state.

19. The information handling system of claim 18, further comprising a baseboard management controller configured to determine that the information handling system is in the soft power-off state, and in response to select the first voltage level, to direct the switch to decouple the battery to the main power rail, and to direct the converter to operate in the pass-through mode.

20. The information handling system of claim 19, wherein the baseboard management system is further configured to determine that the information handling system is in the power-on state, and in response to select the second voltage level, to direct the switch to couple the battery to the main power rail, and to direct the converter to operate in the conversion mode.

* * * * *